(12) United States Patent
Miyauchi (10) Patent No.: US 6,625,060 B2
(45) Date of Patent: Sep. 23, 2003

(54) MICROCOMPUTER WITH EFFICIENT PROGRAM STORAGE

(75) Inventor: Shigenori Miyauchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/910,810

(22) Filed: Jul. 24, 2001

(65) Prior Publication Data

US 2002/0089875 A1 Jul. 11, 2002

(30) Foreign Application Priority Data

Jan. 11, 2001 (JP) ........................... 2001-003688

(51) Int. Cl.[7] ............................................. G11C 14/00
(52) U.S. Cl. ............................. 365/185.08; 365/185.03
(58) Field of Search ....................... 365/185.08, 185.03, 365/185.01

(56) References Cited

U.S. PATENT DOCUMENTS 4,868,760 A * 9/1989 Obara ..................... 219/69.12
5,832,260 A * 11/1998 Arora et al. ............... 712/239
5,910,806 A * 6/1999 Narui et al. ................ 345/11

FOREIGN PATENT DOCUMENTS

| JP | 08-147186 | 6/1996 |
| JP | 11-288409 | 12/1999 |

* cited by examiner

*Primary Examiner*—Hoai Ho
(74) *Attorney, Agent, or Firm*—McDermott, Will & Emery

(57) ABSTRACT

A microcomputer and memory control method for the same can reduce the number of parts, cost, and the total surface area required to mount the parts, and thus miniaturize the device in which the microcomputer is incorporated. A microcomputer with a CPU and memory storing a program executed by the CPU comprises a block access nonvolatile memory for storing the program; at least one random access memory unit for temporarily storing an externally input program; and reads the program stored in the block access nonvolatile memory and stores the program in the random access memory as a program sequentially read and executed by the CPU.

12 Claims, 7 Drawing Sheets

MICROCOMPUTER WITH EFFICIENT PROGRAM STORAGE

BACKGROUND OF THE INVENTION

The present invention relates to a microcomputer with a CPU mounted therein, and to a memory control method used FOR the microcomputer.

Devices with a CPU mounted therein generally have ROM or nonvolatile memory as the main memory for storing programs ("firmware" below) executed by the CPU, which is randomly accessible in storing programs. Randomly accessible RAM (such as SRAM or DRAM) is also provided on board as temporary storage for data that is continually being rewritten. Each of these memories is mapped to address space defined by the CPU. The firmware can be read directly from nonvolatile memory to CPU and executed.

Figure 7:
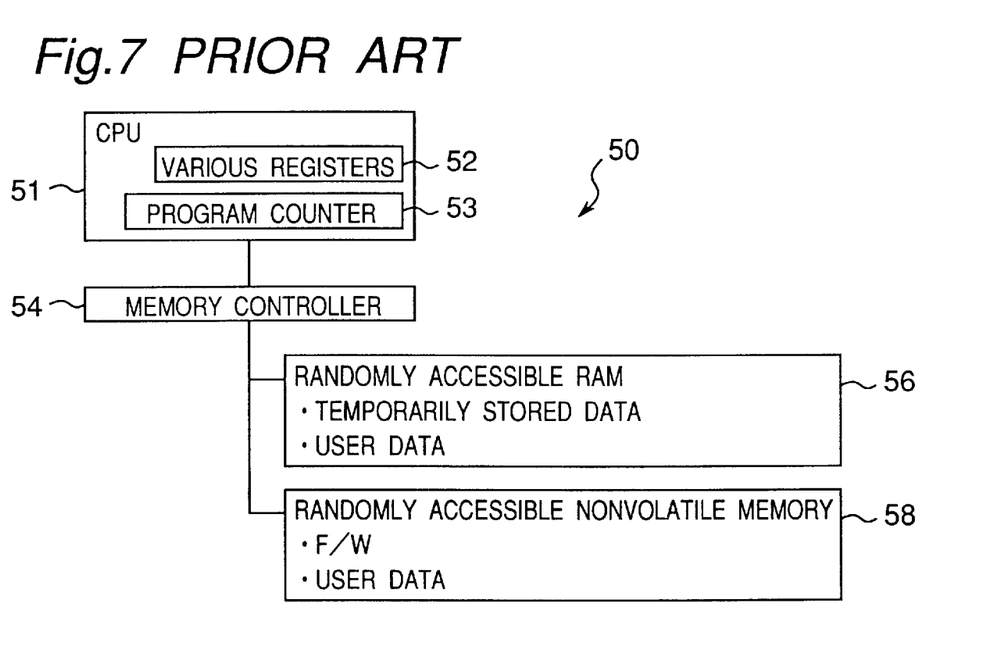
FIG. 7 is a schematic block diagram showing the configuration of a microcomputer according to the prior art.

FIG. 7 is a block diagram showing the configuration of a microcomputer with a randomly accessible memory (referred to below as "random access memory") mounted therein. This microcomputer 50 has a CPU 51, a memory controller 54 for controlling the memory used by the CPU 51, random access memory (RAM) 56 used to temporarily store data that is frequently rewritten by the CPU 51, and randomly accessible nonvolatile memory 58 used for storing user data and firmware not frequently rewritten. The CPU 51 also has internal registers 52 used for data storage and operations, and program counter 53 indicating the storage address of the program executed next.

Memory controller 54 controls a signal for data reading and writing to memory in response to memory access requests from CPU 51. As noted above, randomly accessible RAM 56 temporarily stores various types of data, including user data, and randomly accessible nonvolatile memory 58 stores user data and firmware that need not be rewritten frequently. Data stored in RAM 56 is generally lost when the power supply is interrupted, and microcomputer 50 must therefore also store the data to nonvolatile memory 58 if the data must be saved.

In recent years, however, the explosion in functions provided in a portable terminal device such as cellular phone, notebook computer, personal digital assistant (PDA), has also increased the complexity of the firmware, and as it grows there is also a tendency for growth in the amount of data for user's personal information to be stored. This means that the capacity of ROM and RAM on devices must also increase.

The maximum storage capacity of such randomly accessible memory devices is, however, 32 Mbit to 64 Mbit in the case of nonvolatile memory, and about 4 Mbit in the case of SRAM. In random access memory, the address controller is typically comparatively large and the memory cell structure is complicated, and the chip size is therefore large. The chip mounting area thus also increases in conjunction with the increase in capacity of ROM and RAM. This is obviously not desirable for portable terminal devices of which miniaturization has been advanced.

Distinct from random access memory, block access memory is known, which its chip mounting area is small considering its storage capacity. Block access memory can store about 512 bytes to 2 Kbytes of data per address, and serial data input/output can be achieved by generating a data I/O clock signal for the memory. Furthermore, because the address controller and memory cell structure are less complicated than those of random access memory, block access memory chips can be manufactured with relatively greater storage capacity than a random access memory chip of the same size. Hitherto, there are also block access nonvolatile memory devices with storage capacity exceeding 256 Mbit.

Block access nonvolatile memory is not, however, randomly accessible, and programs cannot be executed by directly mapping memory to memory address space defined by the CPU. Furthermore, while providing randomly accessible nonvolatile memory for firmware storage, randomly accessible RAM for temporarily data storage, and block access nonvolatile memory for storing large amounts of user data to deal with the increase in firmware and data size makes it possible to achieve the desired functions, the number of parts is increased and an increase in cost grows. In addition, the total area needed to mount all of these parts also obviously increases.

The present invention was conceived with consideration for the above problems, and an object of this invention is to provide a microcomputer with a CPU and memory storing a program executed by CPU, that can reduce the number of parts, cost, and the total surface area required to mount the parts, and thus facilitates reducing the size of the device in which the microcomputer is used.

A further object of the invention is to provide a memory control method for the microcomputer.

SUMMARY OF THE INVENTION

In an aspect of the present invention, there is provided a microcomputer with a CPU and memory storing a program executed by the CPU mounted therein, the microcomputer comprising; a block access nonvolatile memory for storing the program; at least one random access memory for temporarily storing an externally input program; and a memory controller for reading the program stored in the block access nonvolatile memory and storing the program in the random access memory as a program sequentially read and executed by the CPU.

Preferably, the memory controller may detect a value set on a program counter indicating an address in the program to be executed by the CPU and read the program corresponding to the value from the block access nonvolatile memory, and store the program in the random access memory.

Before the value set on the program counter goes outside the range of the program temporarily stored in the random access memory, the memory controller yet further preferably may read a following program to be executed hereafter from the block access nonvolatile memory and store the read program to random access memory.

Further preferably, the memory controller may read the following program stored in random access memory and interpret contents of the program, and if the following program contains a conditional branch instruction, the memory controller may read the program starting from the address indicated by the branch instruction from block access nonvolatile memory and store the read program in random access memory.

In an another aspect of the present invention, there is provided a memory control method used for a microcomputer with a CPU and memory storing a program executed by the CPU mounted therein, the method comprising steps of: reading the program from block access nonvolatile memory storing the program; and storing the read the program in random access memory for temporarily storing an externally input program as a program sequentially read and executed by the CPU.

This memory control method preferably comprises further steps of detecting a value set to a program counter indicating an address of a program to be executed by the CPU, reading the program corresponding to the value from the block access nonvolatile memory, and storing the program in the random access memory.

Further preferably, the memory control method comprises a further step of reading a following program to be executed hereafter from the block access nonvolatile memory and storing the read following program in random access memory before the value set on the program counter goes outside the range of the program temporarily stored in the random access memory.

Yet further preferably, the memory control method comprises further steps of reading the following program stored in random access memory, interpreting contents of the program, and if the interpreted following program contains a conditional branch instruction, reading the program starting from an address indicated by a conditional branch instruction from block access nonvolatile memory, and storing the program in random access memory.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
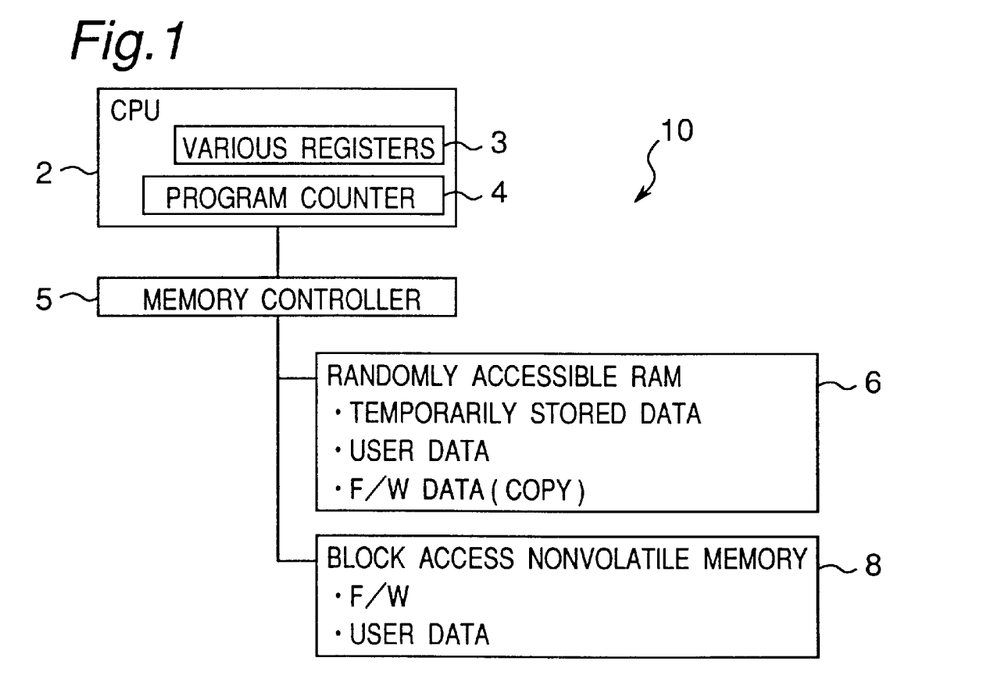
FIG. 1 is a schematic block diagram showing the configuration of a microcomputer according to a first embodiment of the present invention.

The preferred embodiments of the present invention are described below with reference to the accompanying figures.
First Embodiment FIG. 1 is a schematic block diagram showing the configuration of a microcomputer according to a first embodiment of the present invention. This microcomputer 10 has a CPU 2, a memory controller 5 for controlling memory used by the CPU 2, random access memory (RAM) 6 used to temporarily store data that is frequently rewritten by the CPU 2, and block access nonvolatile memory 8 used for storing user data and firmware (designated as "F/W" in Figs.) that need not be rewritten frequently. In this first embodiment of the invention, flash memory is used as the block access nonvolatile memory 8 in a microcomputer 10.

The CPU 2 also has various registers 3 used for data storage and operations, and program counter 4 indicating the storage address of the program executed next.

Memory controller 5 controls data reading and writing to memory in response to memory access requests from CPU 2. In this first embodiment, memory controller 5 generates a wait cycle in response to a memory access request from CPU 2 to halt memory access. Furthermore, in this first embodiment of the invention, RAM 6 temporarily stores data including user data which is frequently rewritten by CPU 2, and also temporarily stores firmware read from block access nonvolatile memory 8.

When the power is turned on to a microcomputer 10 thus comprised, memory controller 5 generates a wait cycle for the CPU 2 and causes memory access by CPU 2 to wait. The firmware stored in block access nonvolatile memory 8 is then copied to randomly accessible RAM 6.

After copying is completed, memory controller 5 interrupts the wait cycle for CPU 2 and enables memory access by CPU 2. CPU 2 then sequentially reads the firmware temporarily stored in randomly accessible RAM 6, and executes the program.

Figure 2:
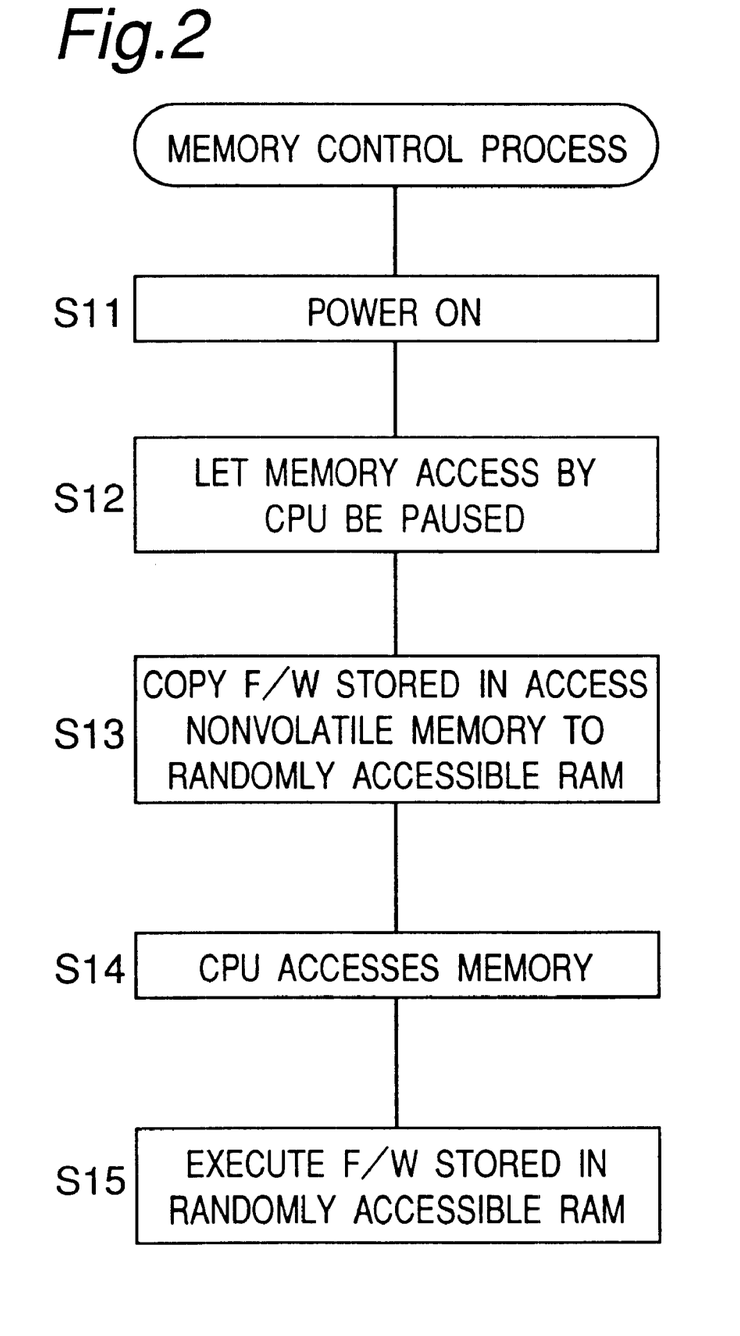
FIG. 2 is a flow chart of a memory control process of the microcomputer shown in FIG. 1.

FIG. 2 shows a flow chart of the memory control process of this microcomputer 10. When power is turned on (S11), a wait cycle is generated for the memory access request from CPU 2 so that memory access by CPU 2 is paused (S12). The firmware stored in block access nonvolatile memory 8 is then read and copied to randomly accessible RAM 6 (S13).

When copying is completed, the wait cycle for CPU 2 is ended so that the CPU 2 can access memory (S14). Then, the firmware stored in randomly accessible RAM 6 is then executed sequentially (S15).

It is therefore possible for the microcomputer 10 to efficiently execute the firmware by executing the memory control process described above while using block access nonvolatile memory 8 with relatively small mounting space requirements, without it being necessary to provide separate memory devices for particular applications, for example, randomly accessible nonvolatile memory for firmware storage, randomly accessible RAM for temporary data storage, and block access nonvolatile memory for large volume user data storage.

It is therefore possible to reduce the number of internal parts, cost, the total surface area required for parts mounting, and miniaturize the device in which the microcomputer is incorporated.

Alternative embodiments of the present invention are described next below. It should be noted that like parts in the first and following embodiment are identified by like reference numeral, and further description thereof is omitted below.

Second Embodiment

Figure 3:
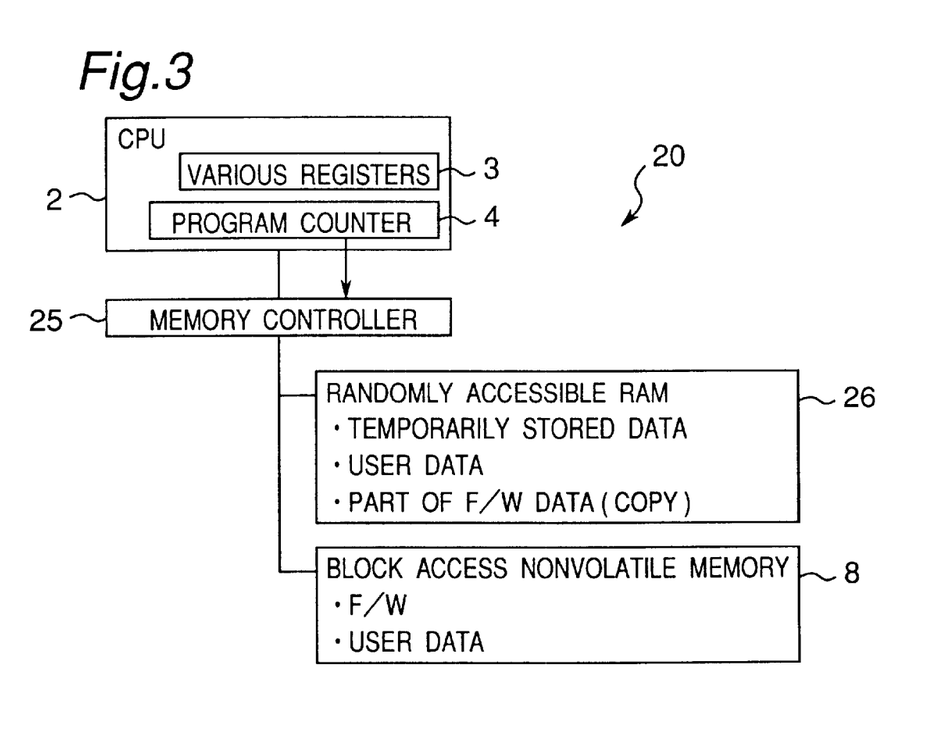
FIG. 3 is a schematic block diagram showing the configuration of a microcomputer according to a second embodiment of the present invention.

FIG. 3 is a schematic block diagram showing the configuration of a microcomputer according to a second embodiment of the present invention. This microcomputer 20 has substantially identical configuration of the microcomputer 10 according to first embodiment, differing in that randomly accessible RAM 26 temporarily stores only the firmware read from block access nonvolatile memory 8, and memory controller 25 can monitor the value of program counter 4 in CPU 2.

When the power is turned on for microcomputer 20 thus comprised, memory controller 25 generates a wait cycle for CPU 2, causing memory access by CPU 2 to wait, and detects the value (that is the storage address, referred to below as the PC value) set on program counter 4. Memory controller 25 then reads the amount of firmware including the PC value, that can be stored in randomly accessible RAM 26 from block access nonvolatile memory 8 and copies it to randomly accessible RAM 26. After copying is completed, memory controller 25 interrupts the wait cycle for CPU 2 and enables memory access by CPU 2. CPU 2 then sequentially reads the firmware temporarily stored in randomly accessible RAM 26, and executes it.

In this second embodiment, if a PC value outside the address range of firmware read from block access nonvolatile memory 8 is set on program counter 4 when the power is turned on, memory controller 25 in this second embodiment generates a wait cycle for CPU 2 and causes memory access by CPU 2 to wait. The memory controller 25 then again reads the amount of firmware including the PC value, which can be stored in randomly accessible RAM 26, and copies it to RAM 26. After copying is completed, memory controller 25 interrupts the wait cycle for CPU 2 and enables memory access by CPU 2. CPU 2 then sequentially reads the firmware temporarily stored in randomly accessible RAM 26, and executes it.

Figure 4:
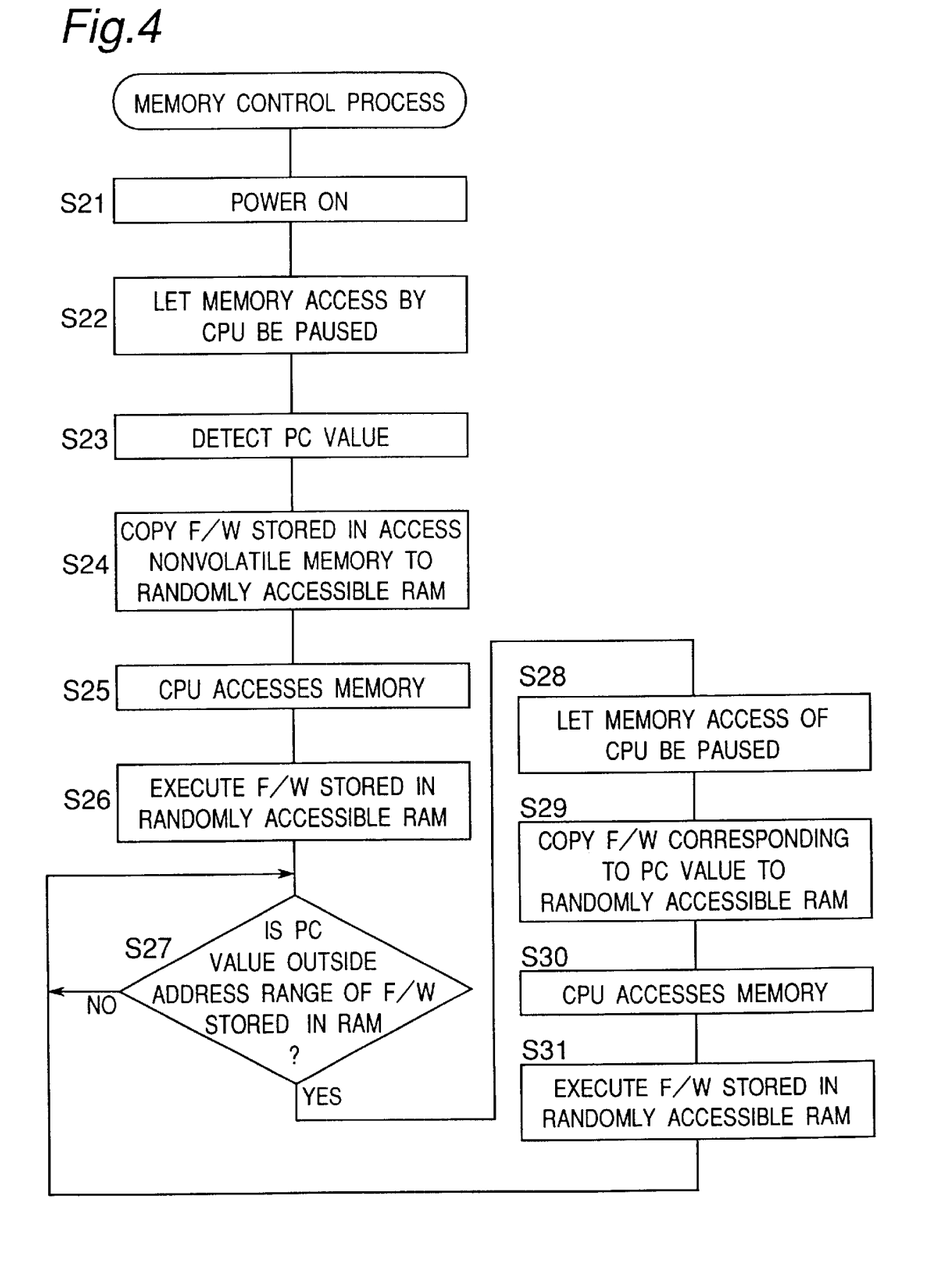
FIG. 4 is a flow chart of a memory control process of the microcomputer shown in FIG. 3.

FIG. 4 shows a flow chart of the memory control process of this microcomputer 20. When power is turned on (S21), a wait cycle is generated in response to the memory access request from CPU 2 so that memory access is paused (S22). The PC value set on program counter 4 in CPU 2 is then detected (S23). Firmware including the PC value, that can be stored in randomly accessible RAM 26 (that is, part of the firmware) is then read and copied to randomly accessible RAM 26 (S24).

When copying is completed, the Wait cycle for CPU 2 is ended so that the CPU 2 can access memory (S25). The firmware stored in randomly accessible RAM 26 is then executed sequentially (S26).

The PC value set on program counter 4 is then detected and checked to determine whether the PC value is outside the address range of firmware read from block access nonvolatile memory 8 when the power is turned on (S27). If the address is outside the address range (S27 returns yes), the procedure advances to step S28; if not (S27 returns no), step S27 repeats.

A wait cycle for CPU 2 is again generated in step S28 to let memory access be paused (S28). Firmware including the PC value that can be stored in randomly accessible RAM 26 is then afresh read and copied to randomly accessible RAM 26 (S29). When copying is completed, the wait cycle for CPU 2 is ended so that the CPU 2 can access memory (S30). The firmware stored in randomly accessible RAM 26 is then executed sequentially (S31).

It is therefore possible for the microcomputer 20 to efficiently run the firmware by executing the memory control process described above while using block access nonvolatile memory 8 with relatively small mounting space requirements, without it being necessary to provide separate memory devices for particular applications, for example, randomly accessible nonvolatile memory for firmware storage, randomly accessible RAM for temporary data storage, and block access nonvolatile memory for large volume user data storage.

It is therefore possible to reduce the number of internal parts, cost, the total surface area required for parts mounting, and miniaturize the device in which the microcomputer is incorporated.

Figure 5:
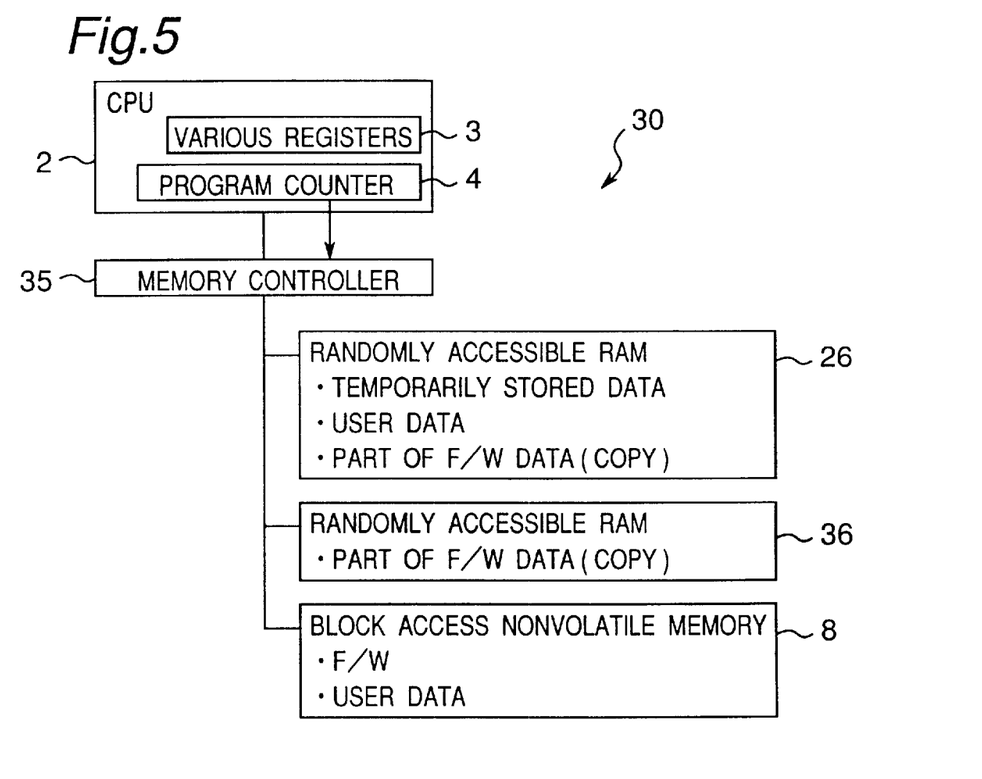
FIG. 5 is a schematic block diagram showing the configuration of a microcomputer according to a third embodiment of the present invention.

According to this second embodiment, since only part of the firmware is sequentially stored in randomly accessible RAM 26, it is therefore possible to further miniaturize the device by using smaller randomly accessible RAM 26, without it being necessary to provide RAM sufficient to store all of the firmware, Third Embodiment FIG. 5 is a schematic block diagram showing the configuration of a microcomputer according to third embodiment of the present invention. This microcomputer 30 has substantially identical configuration of the microcomputer 20 according to second embodiment. In this third embodiment, however, randomly accessible RAM 36 is provided in addition to randomly accessible RAM 26 for temporarily storing part of the firmware read from block access nonvolatile memory 8. Firmware corresponding to the PC value set on program counter 4, and part of the firmware to be executed hereafter (the "following firmware" below), are stored in randomly accessible RAM 26 and 36. Further, in this third embodiment, memory controller 35 reads the following firmware stored in randomly accessible RAM 26 and 36 and can interpret contents of it.

When the power is turned on for microcomputer 30 thus comprised, memory controller 35 generates a wait cycle for CPU 2, causing memory access by CPU 2 to wait. Microcomputer 30 detects the PC value set on program counter 4. Memory controller 35 then reads the amount of firmware including the PC value, that can be stored in randomly accessible RAM 26 and 36 from block access nonvolatile memory 8 and copies it to randomly accessible RAM 26 and 36. After copying is completed, memory controller 25 interrupts the wait cycle for CPU 2 and enables memory access by CPU 2. CPU 2 then sequentially reads the firmware temporarily stored in randomly accessible RAM 26 and 36, and executes it.

Memory controller 35 also reads the following firmware from block access nonvolatile memory 8 before the PC value of program counter 4 goes outside the range of firmware temporarily stored in randomly accessible RAM 26 and 36, and copies the following firmware to whichever randomly accessible RAM 26 and 36 is not being accessed by CPU 2 at that time.

Memory controller 35 also reads the following firmware stored in randomly accessible RAM 26 and 36, and interprets contents of it to detect any conditional branch instructions in the firmware. If a conditional branch instruction is found, the following firmware starting from the address indicated by the branch instruction is read from block access nonvolatile memory 8 and copied to the randomly accessible RAM 26 or 36 not being accessed by CPU 2 at that time.

Figure 6:
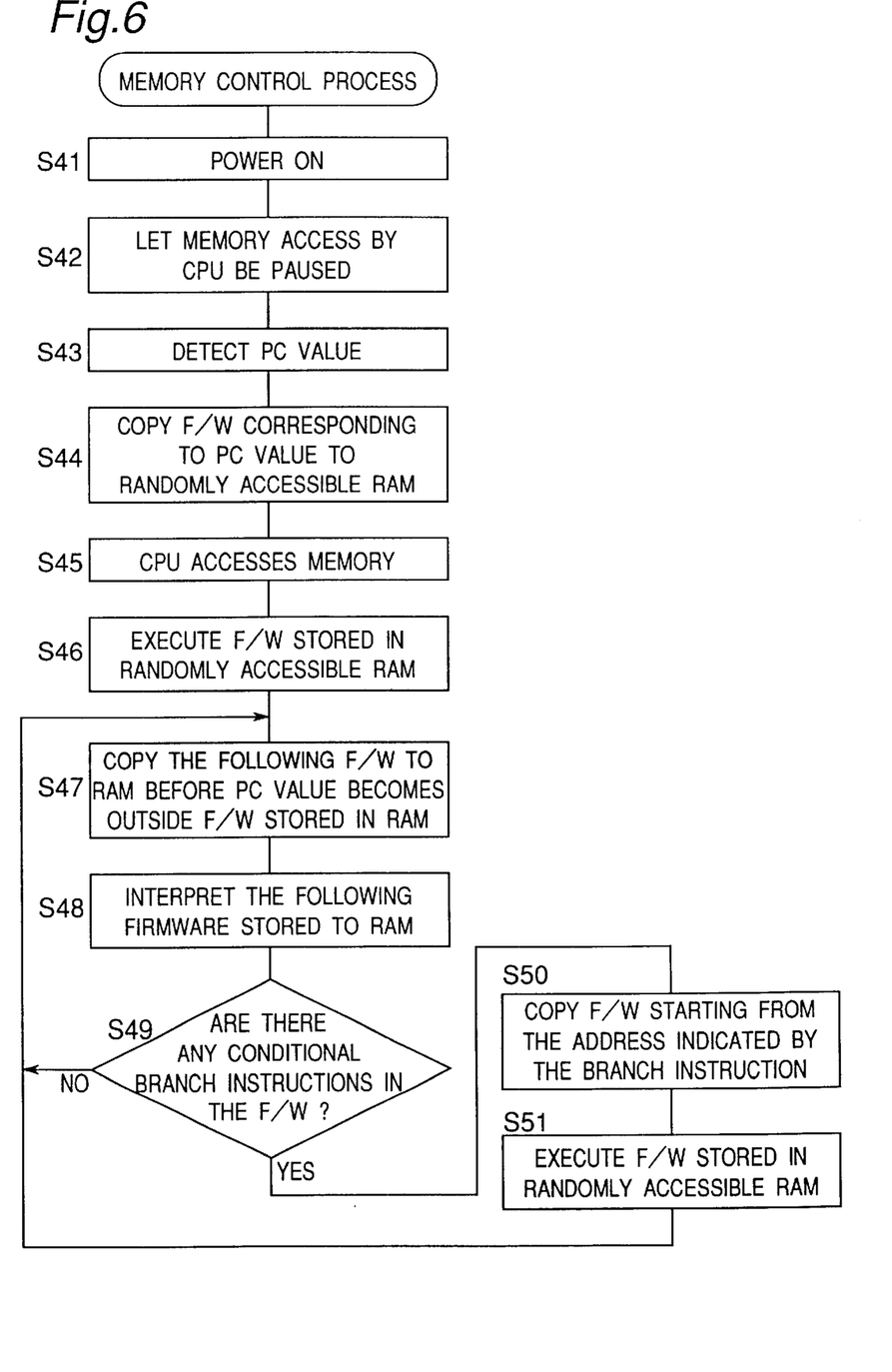
FIG. 6 is a flow chart of a memory control process of the microcomputer shown in FIG. 5.

FIG. 6 shows a flow chart of the memory control process of this microcomputer 30. When power is turned-on (S41), a wait cycle is generated for the memory access request from CPU 2 so that memory access is paused (S42). The PC value set on program counter 4 in CPU 2 is then detected (S43). Firmware including the PC value, that can be stored in randomly accessible RAM 26 and 36 is then read and copied to randomly accessible RAM 26 and 36 (S44).

When copying is completed, the Wait cycle for CPU 2 is ended so that the CPU 2 can access memory (S45). The firmware stored in randomly accessible RAM 26 and 36 is then executed sequentially (S46).

Before the PC value of program counter 4 goes outside the range of firmware temporarily stored in randomly accessible RAM 26 and 36, memory controller 35 reads the following firmware from block access nonvolatile memory 8 and copies it to whichever randomly accessible RAM 26 and 36 is not being accessed by CPU 2 at that time (S47).

Memory controller 35 then reads the following firmware stored in randomly accessible RAM 26 and 36, and interprets contents of it (S48). Next, memory controller 35 detects whether there are any conditional branch instructions in the firmware (S49). If there are not (S49 returns no), the procedure loops back to S47 and steps S47 to S49 repeat. If a conditional branch instruction is found (S49 returns yes), the following firmware starting from the address indicated by the branch instruction is read from block access nonvolatile memory 8 and copied to the randomly accessible RAM 26 or 36 not being accessed by CPU 2 at that time (S50). The firmware stored in randomly accessible RAM 26 or 36 is then executed sequentially (S51)

It is therefore possible for microcomputer 30 to efficiently execute the firmware by executing the memory control process described above while using block access nonvolatile memory 8 with relatively small mounting space requirements and providing plural randomly accessible RAM devices 26 and 36 for temporarily storing part of the firmware, without it being necessary to provide separate memory devices for particular applications, for example, randomly accessible nonvolatile memory for firmware storage, randomly accessible RAM for temporary data storage, and block access nonvolatile memory for large volume user data storage.

It is therefore possible to reduce the number of internal parts, reduce cost, reduce the total surface area required for parts mounting, and miniaturize the device in which the microcomputer is incorporated.

A microcomputer 30 according to this third embodiment also can shorten the wait time for CPU 2 and thus execute processes more quickly because it reads the following firmware from block access nonvolatile memory 8 and copies it to randomly accessible RAM 26 or 36 before the PC value set on program counter 4 goes outside the range of firmware temporarily stored in randomly accessible RAM 26 and 36.

As also described above, microcomputer 30 reads the following firmware stored in randomly accessible RAM 26 and 36 and interprets contents of it to detect any conditional branch instructions, and if it finds any branch instructions reads the following firmware starting from the address indicated by the branch command from block access nonvolatile memory 8 and copies it to randomly accessible RAM 26 and 36. As a result, a microcomputer 30 according to this third embodiment can shorten the wait time for CPU 2 and thus execute processes more quickly.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A microcomputer with a CPU and a memory storing a program executable by the CPU, comprising:
   at least one random access nonvolatile memory capable of temporarily storing an externally input program;
   a block access nonvolatile memory for storing the program, wherein the block access nonvolatile memory has a greater storage capacity than a storage capacity of said random access memory, and wherein said program can be read from the block access nonvolatile memory; and
   a memory controller for reading the program stored in the block access nonvolatile memory and storing the read program in the random access memory as a program sequentially read and executed by the CPU.

2. A microcomputer according to claim 1, wherein the memory controller can detect a value set on a program counter indicating an address in the program to be executed by the CPU, reads the program corresponding to the value from the block access nonvolatile memory, and stores the program in the random access memory.

3. A microcomputer according to claim 2, wherein before the value set on the program counter goes outside the range of the program temporarily stored in the random access memory, the memory controller reads a following program to be executed thereafter from the block access nonvolatile memory and stores the read program in random access memory.

4. A microcomputer according to claim 3, wherein the memory controller further reads the following program stored in random access memory and interprets contents of the program, and if the following program contains a conditional branch instruction, the memory controller reads the program starting from the address indicated by the branch instruction from block access nonvolatile memory and stores the read program in random access memory.

5. A microcomputer according to claim 1, wherein before a value set on a program counter goes outside the range of the program temporarily stored in the random access memory, the memory controller reads a following program to be executed thereafter from the block access nonvolatile memory and stores the read program in random access memory.

6. A microcomputer according to claim 5, wherein the memory controller further reads the following program stored in random access memory and interprets contents of the program, and if the following program contains a conditional branch instructions, the memory controller reads the program starting from the address indicated by the branch instruction from block access nonvolatile memory and stores the read program in random access memory.

7. A memory control method used in a microcomputer having an on-board CPU and memory storing a program executable by the CPU, comprising steps of:
   reading the program from block access nonvolatile memory storing the program; and
   storing the read program in random access memory for temporarily storing an externally input program as a program sequentially read and executed by the CPU; wherein the block access nonvolatile memory has a greater storage capacity than a storage capacity of said random access memory, and wherein said program can be read from the block access nonvolatile memory.

8. A memory control method according to claim 7, further comprising steps of:
   detecting a value set on a program counter indicating an address of a program to be executed by the CPU;
   reading the program corresponding to the value from the block access nonvolatile memory; and
   storing the program in the random access memory.

9. A memory control method according to claim 8, further comprising a step of:
   reading a following program to be executed hereafter from the block access nonvolatile memory and storing the read following program in random access memory before the value set on the program counter goes outside the range of the program temporarily stored in the random access memory.

10. A memory control method according to claim 9, further comprising steps of:
   reading the following program stored in random access memory and interpreting contents of the program; and
   if the interpreted following program contains a conditional branch instruction, reading the program starting from an address indicated by a conditional branch instruction from block access nonvolatile memory and storing the program in random access memory.

11. A memory control method according to claim 7, further comprising a step of:

reading a following program to be executed hereafter from the block access nonvolatile memory and storing the read following program to random access memory before a value set on a program counter goes outside the range of the program temporarily stored in the random access memory.

12. A memory control method according to claim 11, further comprising steps of:

reading the following program stored in random access memory and interpreting contents of the program; and if the interpreted following program contains a conditional branch instruction, reading the program starting from an address indicated by a conditional branch instruction from block access nonvolatile memory and storing the program in random access memory.

* * * * *